Oct. 16, 1923.

C. H. HAPGOOD 1,471,125

REFRIGERATING MACHINE

Filed Aug. 11, 1919

8 Sheets-Sheet 1

Inventor
Cyrus H. Hapgood
By his Attorney
George P. Carroll

Oct. 16, 1923.  1,471,125
C. H. HAPGOOD
REFRIGERATING MACHINE
Filed Aug. 11, 1919  8 Sheets-Sheet 2

Oct. 16, 1923.

C. H. HAPGOOD

REFRIGERATING MACHINE

Filed Aug. 11, 1919

1,471,125

8 Sheets-Sheet 4

Cyrus H. Hapgood, Inventor
By his Attorney
George P. Carroll

Oct. 16, 1923.

C. H. HAPGOOD 1,471,125

REFRIGERATING MACHINE

Filed Aug. 11, 1919

8 Sheets-Sheet 5

Oct. 16, 1923.
C. H. HAPGOOD
1,471,125
REFRIGERATING MACHINE
Filed Aug. 11, 1919
8 Sheets-Sheet 6
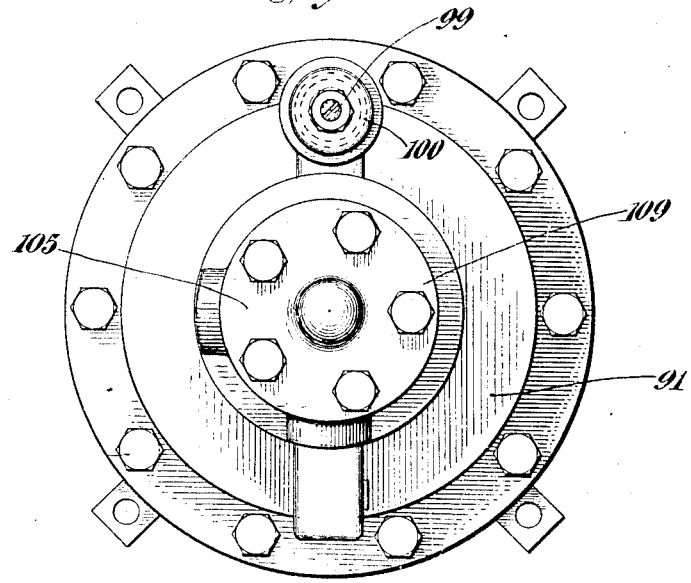
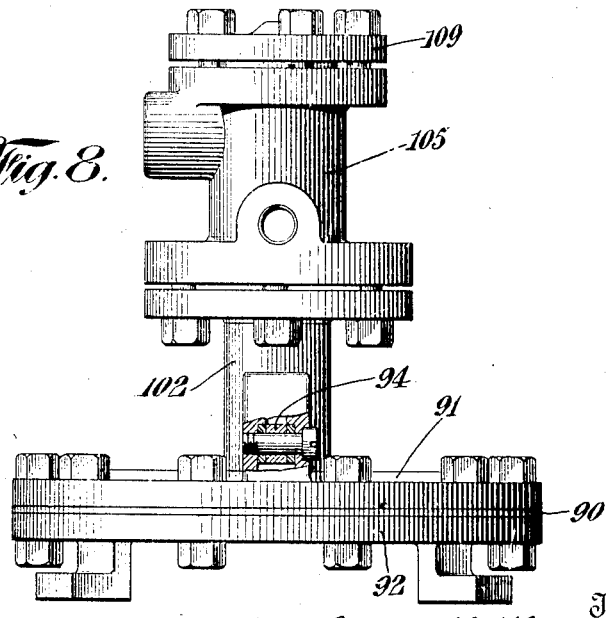

Oct. 16, 1923.
C. H. HAPGOOD
REFRIGERATING MACHINE
Filed Aug. 11, 1919
1,471,125
8 Sheets-Sheet 7
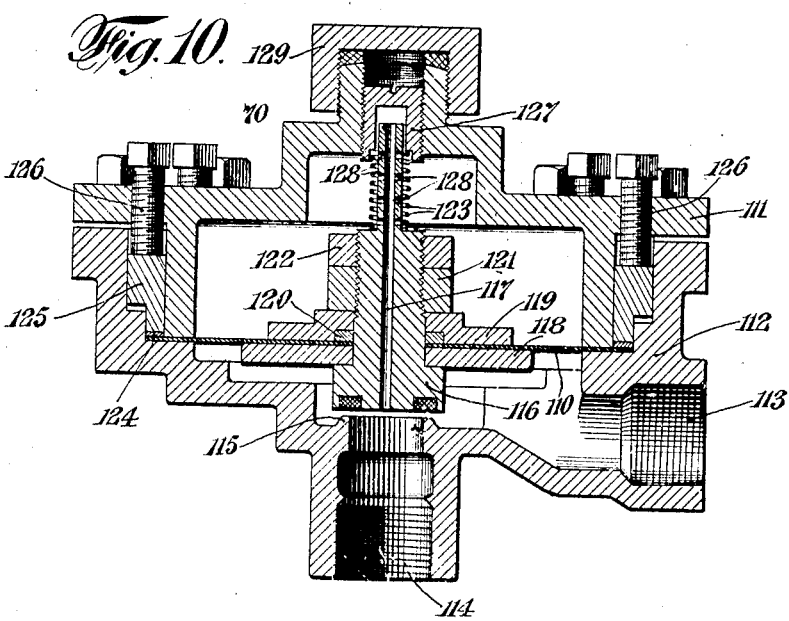
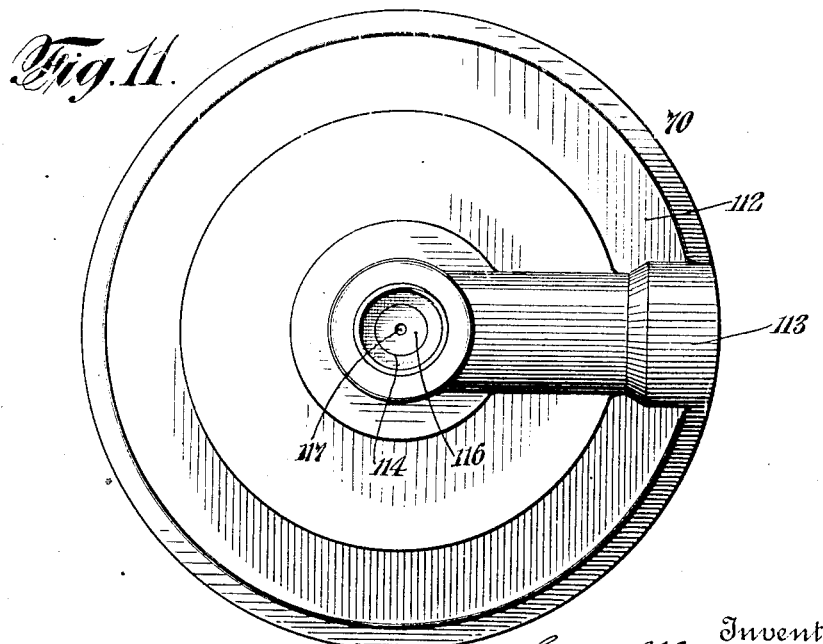
Inventor
Cyrus H. Hapgood
By his Attorney
George P. Carroll Oct. 16, 1923.

C. H. HAPGOOD 1,471,125

REFRIGERATING MACHINE

Filed Aug. 11, 1919

8 Sheets-Sheet 8

Inventor
Cyrus H. Hapgood
By his Attorney
George P. Carroll

Patented Oct. 16, 1923.

1,471,125

UNITED STATES PATENT OFFICE.

CYRUS H. HAPGOOD, OF NEW YORK, N. Y., ASSIGNOR TO GEORGE P. CARROLL, OF HARTFORD, CONNECTICUT.

REFRIGERATING MACHINE.

Application filed August 11, 1919. Serial No. 316,815.

*To all whom it may concern:*

Be it known that I, CYRUS H. HAPGOOD, a citizen of the United States, residing at New York, in the county of New York and State of New York, have invented a new and useful Refrigerating Machine, of which the following is a specification.

My invention relates to improvements in refrigerating machines of the absorption type, commonly employing ammonia or formaldehyde as the refrigerant and water or some chemical as the absorbent. For simplicity, however, in the present discussion, the figures relating to temperature and pressure conditions, unless otherwise specified, are to be understood as applying to machines using ammonia as the refrigerant and water as the absorbent. The purpose of my invention is to provide simple, safe, compact, inexpensive and reliable means for the automatic operation of absorption refrigerating machines, of the intermittent or alternating type, that, with slight changes of construction, may employ any kind of heating medium for the still, such as gas, steam, kerosene or electricity. The means for accomplishing these purposes will be hereinafter stated.

Figure 1:
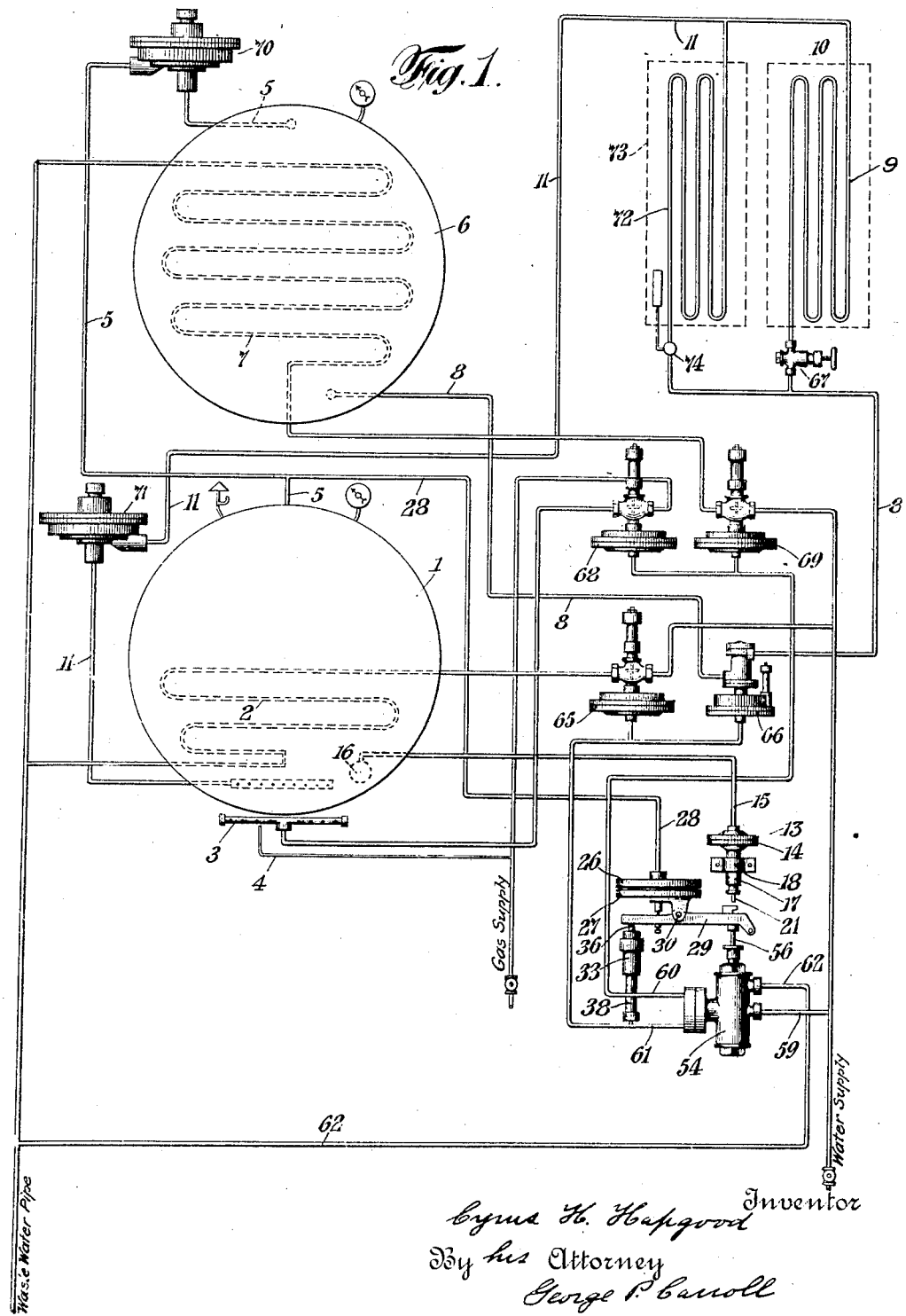
Figure 2:
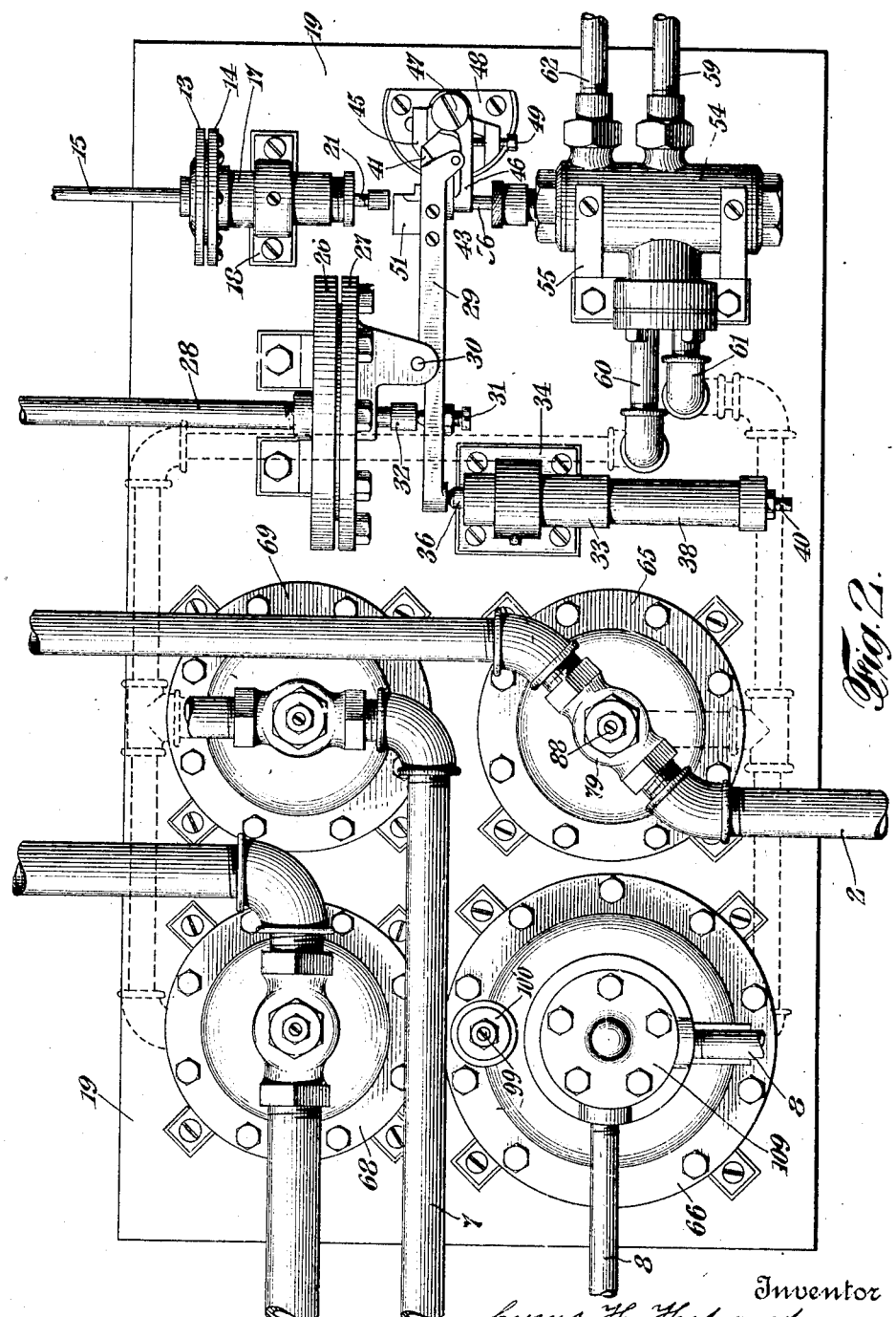
Figure 3:
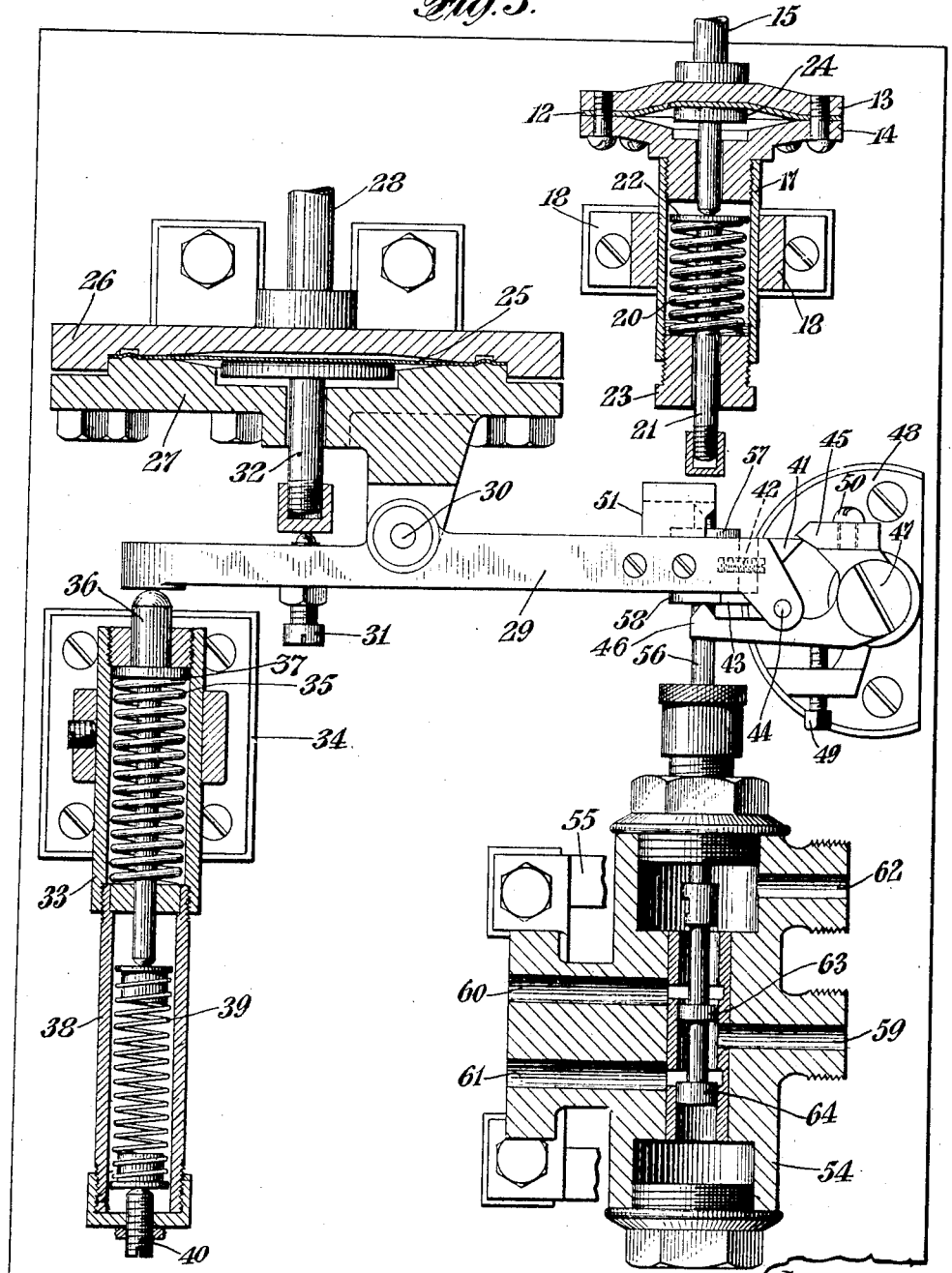
Figure 4:
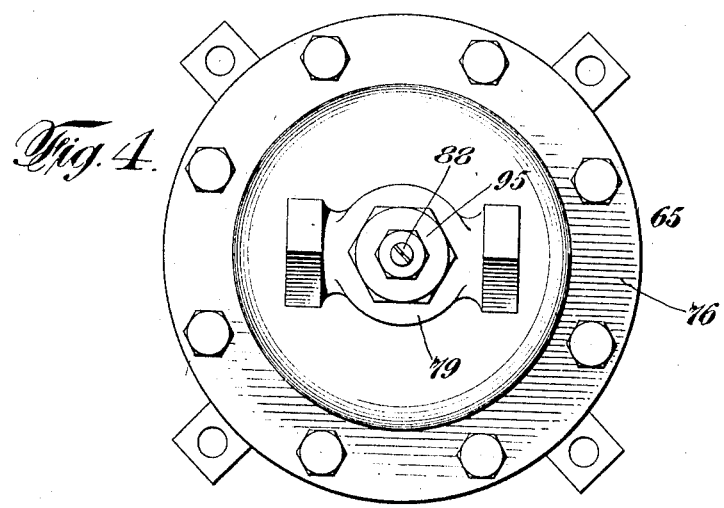
Figure 5:
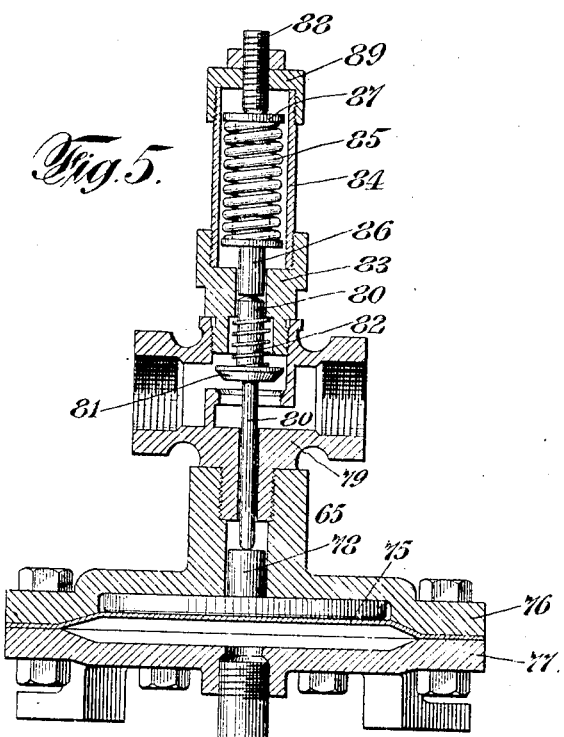
Figure 6:
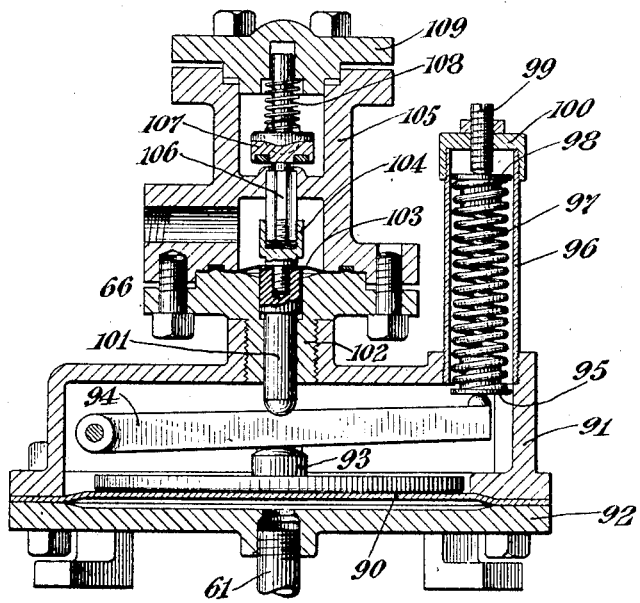
Figure 7:
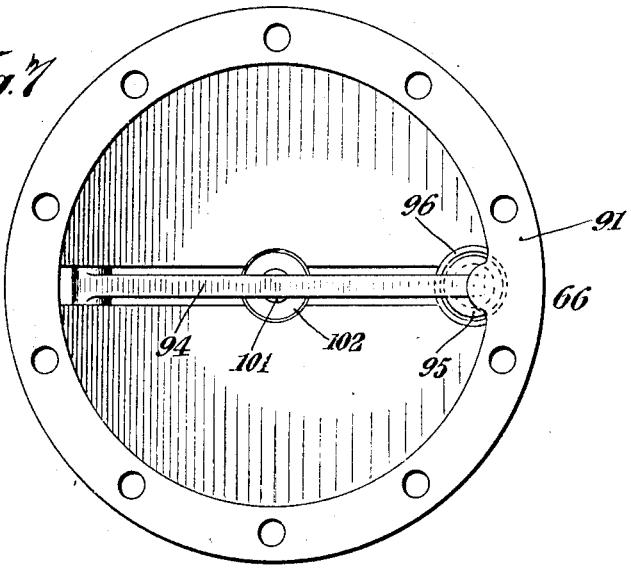
Figure 12:
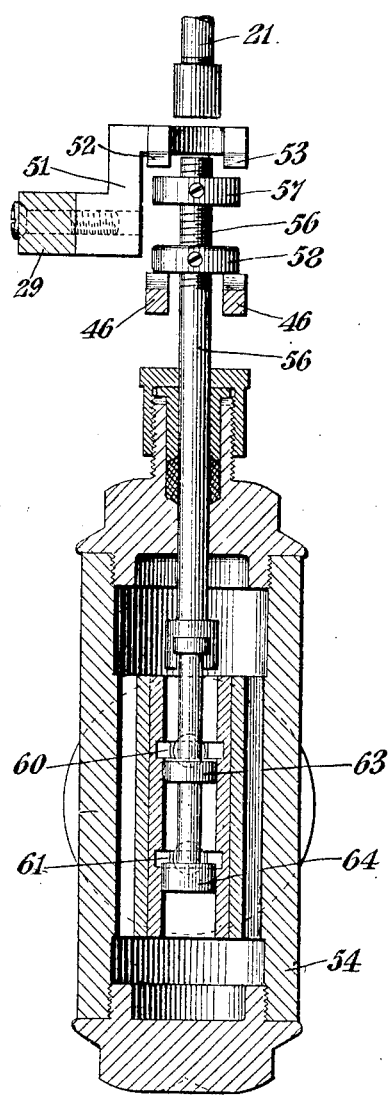
Figure 13:
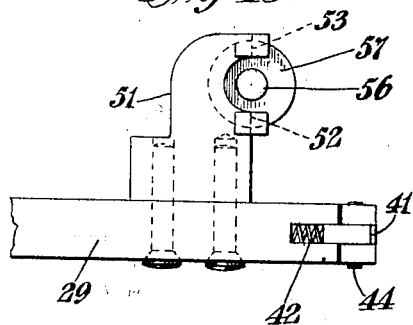
Figure 14:
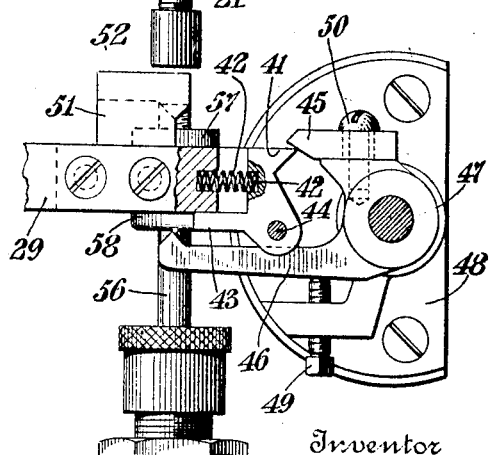

In the drawings, Fig. 1 is a diagrammatic representation of my invention, showing the controlling mechanism operatively connected with a still, a condenser and an evaporator in circuit, it being understood that in practice these latter elements are subject to great variations in construction and proportioning. Fig. 2 is a plan view of my controlling mechanism. Fig. 3 is in part a horizontal section and in part a repetition of part of the construction of the preceding figure. Fig. 4 is a plan view and Fig. 5 is a partial vertical section and a partial elevation of a valve 65. Fig. 6 is a vertical section, with some details in elevation, of a valve 66. Fig. 7 is a bottom view of the valve 66 with the parts 61, 90, 92 and 93 removed. Fig. 8 is an end view of the valve 66, in part broken away and also in part in vertical section. Fig. 9 is a plan view of the valve 66. Figs. 10 and 11 are respectively a vertical section, with some details in elevation, and a bottom view of a valve 70. Fig. 12 is a section on a larger scale through the center of the valve 54 shown in Fig. 2, looking toward the left, and through certain parts above the valve, with, however, certain elements shown in elevation. Fig. 13 is an enlarged plan view of the right end of a lever 29 and certain adjacent parts. Fig. 14 is an enlarged front elevation, in part broken away, of certain parts shown at the right in Fig. 2.

As diagrammatically indicated in Fig. 1, a still 1, also known as a generator-absorber, of any approved construction, contains part of a cooling water coil 2 and is partially filled with an absorbent, such as water, and in combination therewith, in varying proportions, a refrigerant, such as ammonia. In the construction shown, the still 1 is heated by a flame from a gas burner 3, which is ignited from time to time from a pilot burner 4. But I am not limited to any particular kind of heating means. From the still 1 a pipe 5 leads to a condenser 6, of any approved construction, which, in the construction shown, contains part of a cooling water coil 7. From the condenser 6 a liquid refrigerant pipe 8 leads to an evaporator 9, also known as an expansion coil or chamber, which, in the construction shown, is placed in a compartment to be refrigerated 10. From the evaporator 9 a pipe 11 leads back down into the still 1.

A manually operated expansion valve 67 is shown as interposed at the inlet end of the evaporator 9. In parallel with the evaporator 9 is a similar evaporator 72, leading from the pipe 8 to the pipe 11 and placed in a compartment 73. A thermostatically controlled expansion valve 74 is shown as interposed at the inlet end of the evaporator 72, such valves being known in the art. The parts 72, 73 and 74 are shown simply to indicate how my invention may be applied to a plurality of evaporators in parallel and also to a construction where the temperature in a compartment to be refrigerated is automatically controlled.

In accordance with the preferred practice, the condenser 6 is indicated as occupying a position above the still 1; and, in the ascending pipe 5 near its outlet into the condenser, is interposed a non-leaking quick action check valve 70, to be described. Also in accordance with the preferred practice, the pipe 11 leads downward into the lower part of the condenser 1; and in the pipe, near to the still, is interposed a similar check valve 71. The use of check valves, so located, is well known in the art; but it is essential that they close quickly on a change of pressure conditions and that they remain tight when closed.

A base 19, shown in Fig. 2, is positioned with a horizontal surface for supporting certain parts that are also diagrammatically shown in the lower right hand part of Fig. 1; but it is to be understood that the base is attachable in any position to any convenient support, preferably near to the still 1. As indicated in Fig. 1 and as shown in Fig. 2, a water transmitting device or valve 65 is interposed in the inlet part of the coil 2, leading from a source of cold water supply; a refrigerant transmitting device or valve 66 is interposed in the pipe 8; a gas valve 68 is interposed in a gas supply pipe leading to the burner 3, a branch of this pipe from a point in advance of the valve 68 leading to the burner 4; and another water transmitting device or valve 69 is interposed in the lower and inlet part of the coil 7, leading from the same source of cold water supply as does the coil 2. These valves will be later described.

A flexible diaphragm 12, shown in Fig. 3, is secured between upper and lower housings 13 and 14, shown in Figs. 1, 2 and 3. The pocket thus formed between the parts 12 and 13 is connected by a tube 15 with a bulb 16 in the still 1, as indicated in Fig. 1, so positioned that the bulb is at all times immersed in the liquid in the still. The bulb 16 contains water and may be of any approved construction. Secured to the under part of the housing 14 is a spring casing 17, shown in Figs. 1, 2 and 3, which in turn is adjustably secured to a foot 18 that is firmly fastened to the base 19, previously referred to. A compression spring 20, positioned in the casing 17, surrounds a movable stem 21 and presses at the top against a disc 22 secured to one end of the stem. The other end of the spring 20 presses against an adjustable screw 23, fitting in the threaded lower end of the casing 17 and surrounding the stem 21. The disc 22 presses against a plunger 24, the enlarged upper end of which in turn presses against the under side of the diaphragm 12.

A flexible diaphragm 25, shown in Fig. 3, is secured between upper and lower housings 26 and 27, shown in Figs. 1, 2 and 3. The housing 26 is firmly fastened to the base 19. The pocket thus formed between the parts 25 and 26 is connected by a tube 28 with the pipe 5 at a point in advance of the valve 70. A lever 29, shown in Figs. 1, 2 and 3, is carried by the housing 27 and is capable of partial rotation about a stud 30 thereon. The lever 29 carries an adjustable screw 31 which bears against a plunger 32, extending through the housing 27 and the enlarged end of which bears, in turn, against the under side of the diaphragm 25. A spring casing 33 is adjustably secured in a foot 34, which, in turn, is firmly fastened to the base 19. A compression spring 35, positioned in the casing 33, surrounds a movable stem 36 and presses at the top against a washer 37, which fits loosely on the small shank of the stem. The other end of the spring 35 presses against the upper end of a spring casing 38, which is adjustably secured to the casing 33. The enlarged head of the stem 36 reciprocates through the head of the casing 33 and presses against the under surface of the left end of the lever 29 to the left of the screw 31. The lower part of the shank of the stem 36 reciprocates through an opening in the top of the casing 38. A compression spring device 39 consists of a spring having a weaker thrust than the spring 35, of a short flanged headed top extending into the spring and over it and of a short flanged bottom extending into the spring and under it. The spring device 39 is positioned in the casing 38 with its top pressing against the extreme lower end of the shank of the stem 36 and with its bottom pressing against an adjusting screw 40. The screw 40 is screwed into a threaded opening in the lower end of the casing 38.

It is apparent that a counter-clockwise movement of the lever 29 about the stud 30 from the position shown, tending further to compress the spring device 39, will also compress the spring 35 and that a reverse partial rotation will be caused by the spring device 39 only as the thrust of the spring 35 is taken up by the washer 37 bearing against the head of the casing 33.

The lever 29 has a vertical slot in its right end and carries a pawl 41, shown in Figs. 2, 3, 13 and 14, which turns on a pivot 44 supported front and back in the part of the lever forming the sides of the slot. A compression spring 42 at its left end is supported in a socket in the lever 29 to the left of the slot and at its right end presses against the pawl 41 so as to tend to rotate it in a clockwise direction. But an arm 43, which is part of the pawl 41, prevents such rotation, beyond the position shown, by bearing against the under side of the right end of the lever 29. A latch 45 and a forked lever 46, best shown in Figs. 3, 12 and 14, form a member which turns on a stud 47 supported by a stud base 48 secured to the base 19. The extent of the rotation of the parts 45 and 46 in a counter clockwise direction may be regulated by an adjusting screw 49, which is carried by the stud base 48. The construction is such that, when the lever 29 rotates in a counter clockwise direction, the pawl 41 engages the latch 45 and rotates it and the forked lever 46 in a clockwise direction. A continuation of such rotation of the lever 29 causes the pawl 41 to slip by the end of the latch 45, at the same time compressing the spring 42 and rotating the arm 43 away from the lever 29, so that the latch and the forked lever 46 are then free to return to the position shown in the drawings. One end of the latch 45 is fastened to the forked lever 46 by a screw 50, thus making adjustable the position of the outer end of the latch. When the lever 29 travels back in a clockwise partial rotation, the pawl 41 again engages the latch 45, but is pushed in by the latch in opposition to the spring 42, until it passes the end of the latch and then resumes its former position in consequence of the action of the spring. The lever 29 also carries a yoke 51, having ends 52 and 53, the yoke extending backward from near the right end of the lever and being so positioned that the lower end of the stem 21 may pass between the ends 52 and 53, as indicated in Figs. 12 and 13.

A pilot valve 54, of standard construction, is secured to a frame 55, as shown in Figs. 2 and 3, which, in turn, is firmly fastened to the base 19. A valve stem 56 extends upward through the top of the valve 54, passes through the yoke formed by the ends of the forked lever 46 and may pass between the ends 52 and 53, as best shown in Figs. 12 and 13. The stem 56 carries an upper collar 57 and a lower collar 58, both being adjustable and so positioned that a clockwise rotation of the parts 45 and 46 will cause the forked lever 46 to bear against the collar 58 and to move the stem in an upward direction, as best indicated in Figs. 2, 3 and 12. Such a clockwise rotation of the parts 45 and 46, of course, is caused by a counter clockwise rotation of the lever 29. Likewise a clockwise rotation of the lever 29 will cause the ends 52 and 53 to bear upon the collar 57 and to move the stem 56 in a downward direction. The valve 54 has an inlet port and pipe 59, branching from the supply pipe leading to the inlet ends of the coils 2 and 7. A port and pipe 60, shown in Figs. 1, 2, 3 and 12, is adapted to transmit water under pressure, entering the valve 54 from the port and pipe 59, to the valves 68 and 69; a port and pipe 61, also so shown, is adapted to transmit water under pressure, also so entering, to the valves 65 and 66; and both ports and pipes are adapted to transmit a back flow of water, under circumstances to be stated, to a discharge port and pipe 62. The lower part of the stem 56 within the valve 54 carries two pistons 63 and 64, as shown in Figs. 3 and 12. The piston 63 is of the same approximate width as the associated passage of the port and pipe 60; but the piston 64 is one and one half times that width.

The valve 65 is constructed as follows, the valves 68 and 69 being identical in construction and the valve 68 being adapted for the transmission of steam, kerosene or oil, as well as fuel gas. As shown in Figs. 4 and 5, a flexible diaphragm 75 is secured between upper and lower housings 76 and 77, the housing 77 being connected with the port and pipe 61. In the valves 68 and 69 the corresponding housing is connected with the port and pipe 60. A plunger 78 reciprocates slightly in an opening through the vertical center of the housing 76 and has an enlarged part resting on the diaphragm 75. A globe casing 79 is secured to the housing 76 and is provided with a valve seat and inlet and outlet ports leading to and from the seat and severally connecting, as indicated in Fig. 1, with separate parts of the pipe 2. A stem 80 extends through the seat of the casing 79 and carries between its ends a valve disc 81, adapted to close the seat from above. The lower end of the stem 80 bears down upon the plunger 78 and the upper part of the stem is surrounded above the valve disc 81 by a light spring 82, which occupies the lower part of a section casing 83 screwing into the top of the casing 79 and bearing upon the spring. A spring casing 84 screws into the top of the casing 83 and contains a spring 85 resting upon a lower compression member 86, which, in turn, bears upon the top of the stem 80. An upper compression member 87 bears down upon the spring 85 and is adjustably positioned by a screw 88 that passes through a threaded opening in a cap 89 that is screwed around the top of the casing 84.

It is apparent that fluid pressure transmitted through the port and pipe 61 and exerted upward against the diaphragm 75 will open the valve disc 81 and that, on a fall of such pressure, the springs 82 and 85, assisted by gravity, will close the valve disc. The screw 88 is used to adjust the thrust of the spring 85 according to the head of the local water supply.

The valve 66, already referred to, is constructed as follows: As shown in Figs. 6, 7, 8 and 9, a flexible diaphragm 90, preferably of vanadium steel, is secured between upper and lower housings 91 and 92, the lower housing being connected with the port and pipe 61. A plunger 93 has an enlarged part resting on the diaphragm 90. A lever 94 is pivoted at one end in the housing 91, bears centrally upon the plunger 93 and at its other end has bearing upon it a lower compression member 95. A spring casing 96 screws into an opening near the circumference of the housing 91 and contains a spring 97 resting upon the member 95. An upper compression member 98 bears down upon the spring 97 and is adjustably positioned by a screw 99 that passes through a threaded opening in a cap 100 that is screwed around the top of the casing 96. A stem 101, in axial alinement with the plunger 93, reciprocates slightly in an opening through a section casing 102, that is screwed into the top of the housing 91, and at its lower end bears down upon the sloping sides of a notch in the upper surface of the lever 94. A small flexible diaphragm 103 is clamped at its center to the top of the stem 101 by a socket member 104, internally threaded at its top and having a threaded lower end that passes through an opening in the diaphragm and screws into the stem. A valve casing 105 has a valve seat and inlet and outlet ports leading to and from the seat and severally connecting, as shown in Fig. 1, with separate parts of the pipe 8; and it is bolted to the top of the casing 102 so as to clamp the circumference of the diaphragm 103. A stem 106 has a spidered lower end extending downward through the seat of the casing 105 and carries above its spidered part a valve disc 107, adapted to close the seat from above. The lower end of the stem 106 screws into the top of the member 104 and at its upper end is surrounded by a light spring 108 that rests upon the upper surface of the valve disc 107. A cap 109, bolted to the top of the casing 105, bears down upon the top of the spring 108 and has a central socket in which the top of the stem 106 slightly reciprocates.

It is apparent that fluid pressure transmitted through the port and pipe 61 and exerted upward against the diaphragm 90 will open the valve disc 107 and that, on a fall of such pressure, the springs 108 and 97, assisted by gravity, will close the valve disc. The screw 99 is used to adjust the thrust of the spring 97 according to the head of the local water supply. The employment of the lever 94, fulcrumed as described, and of the two springs 108 and 97, the latter being adjustable, makes practicable a very exact adjustment of the valve 66. It is to be understood that in practice the valve 66 is positioned only a short distance in advance of the expansion valves 67 and 74, regulating the amount of flow into the evaporators 9 and 72, respectively.

The valve 70, the valve 71 being identical therewith in construction, is constructed as follows: A flexible diaphragm 110, preferably of vanadium steel, is secured between upper and lower housings 111 and 112. The housing 112 is in the line of the pipe 5 and has an inlet port 113 at one side, an outlet port 114 from its under side and a valve seat 115 between the ports. A valve member 116 has an enlarged lower end adapted for closing the seat 115; it passes through a central opening in the diaphragm 110; it has a threaded section above the diaphragm; it has an upper end of reduced diameter; and it has a small vertical opening 117 from end to end in axial alinement with the seat 115. A retaining plate 118 surrounds the valve member 116 above its enlarged lower end under the diaphragm 110. A similar plate 119 surrounds the valve member 116 above the diaphragm 110 and presses upon a gasket 120 surrounding the valve member at the joint between it and the diaphragm. A nut 121 and a lock nut 122, screwed around the threaded section of the valve member 116, clamp the parts 116, 118, 120 and 119 firmly together. A light spring 123 surrounds the upper end of the valve member 116 and rests upon the part surrounded by the nut 122. A gasket 124 rests upon the circumference of the diaphragm 110 within the raised rim of the housing 112 and is pressed down by a follower 125. The housing 111 is bolted to the housing 112 and has threaded bolts 126 screwed down through threaded openings in the housing 111 so as to bear down upon the follower 125. An externally threaded adjusting member 127, slotted on top, may be screwed up or down in a threaded opening in the top of the housing 111 so as to bear down upon the spring 123, thus causing a greater or less tension of the spring as may be desired. The extreme top of the valve member 116 reciprocates slightly in a cylindrical slot in the member 127 and has in the vicinity of the spring 123 radial openings 128. A removable cap 129 encloses the top of the housing 111 over the member 127.

It is apparent that, if the valve member 116 is closed, fluid entering the port 113, under pressure somewhat in excess of the pressure exerted in the vicinity of the port 114, will bear upward against the diaphragm 110 so as to open the valve member 116 and to compress the spring 123. But part of the fluid in the vicinity of the seat 115 passes upward through the openings 117 and 128 and tends to equalize the pressure above and below the diaphragm 110. Under these conditions, the spring 123, with its tension adjusted by the member 127, tends to seat the valve member 116. This tendency, however, is overcome so long as the pressure of the fluid entering the port 113 exceeds the pressure of the fluid passing through the port 114, by a difference determined by the thrust of the spring 123. But finally, under the conditions that arise from time to time in the operation of an intermittent or alternating absorption refrigerating machine, the pressure of the fluid entering the port 113 will no longer increase, and, as such pressure tends to equal the pressure of the fluid passing through the port 114, the valve member 116, acted upon by the spring 123, will tightly close. The valve thus fully meets the requirements of a check valve in this machine.

The method of operation is as follows: With the parts in the positions shown, water, under pressure from the mains, has passed through the port and pipe 59, the valve 54 and the port and pipe 61 to the valves 65 and 66, causing them to be open and severally to transmit cooling water through the coil 2 to the still 1 and to transmit liquid refrigerant through the pipe 8 to the valves 67 and 74 into the evaporators 9 and 72. From the evaporators 9 and 72 the expanded refrigerant passes through the pipe 11 and the valve 71, which is open under the pressure of the incoming gas, into the still 1, where it is absorbed by the absorbent therein. The heat of absorption is carried away by the water flowing through the coil 2. In other words, the machine is in the absorption period with the compartments 10 and 73 being refrigerated by the vaporization of refrigerant in the evaporators 9 and 72. The length of the absorption period, or period of active refrigeration, depends upon the quantity of refrigerant in the condenser 6 and upon the quantity of heat that has to be taken up in the compartments 10 and 73 per unit of time. Frequently the parts are so proportioned that this period may last from twenty-four hours to a week. Finally, however, the absorbent in the still 1 approaches a saturation limit such that it no longer can economically absorb any more expanded refrigerant. Throughout the absorption period, it is to be noted, the excess of pressure in the condenser 6 over the pressure in the still 1 has kept the valve 70 closed. Now consider especially Figs. 3, 12 and 14. The pressure in the still 1, rising gradually as the absorption period progresses notwithstanding the cooling effect of the water flowing through the coil 2, is transmitted through the pipe 5 and the tube 28 to the diaphragm 25 so as to act on the plunger 32 and the screw 31 in such a way as to rotate the lever 29 counter clockwise, thus compressing the spring 35 and the spring device 39. This rotation of the lever 29, transmitted through the pawl 41 to the parts 45 and 46, causes the lever 46 to move the collar 58, the stem 56 and the pistons 63 and 64 in an upward direction. As this movement progresses, the piston 64 will cover the associated passage of the port and pipe 61 and later the piston 63 will cover the associated passage of the port and pipe 60. When a predetermined pressure is reached, say 30 pounds gage, the piston 64 will open the port and pipe 61 to the discharge port and pipe 62, thus relieving the pressure on the diaphragms of the valves 65 and 66 and causing them to close. At approximately the same time the piston 63 will open the port and pipe 60 to the water supply from the port and pipe 59 and will allow the water pressure to act on the valves 68 and 69, causing them to open and severally to transmit gas to the burner 3 and to transmit coooling water through the coil 7 to the condenser 6. A change is thus effected from the absorption to the heating period. As the heating period begins, the valve 71 closes and the valve 70 soon thereafter opens.

As the heating period progresses, the pressure against the diaphragm 25 increases, causing the lever 25 to continue its partial rotation in a counter clockwise direction until the ports and pipes 61 and 60 are wide open, at which time further rotation is stopped by the enlarged part of the plunger 32 coming in contact with the housing 27. As the heating period further continues, the temperature of the liquid in the still 1 gradually rises to a predetermined limit, say 300 degrees F. This rising temperature is communicated to the water in the bulb 16. As the temperature approaches 300 degrees, the pressure of the steam in the bulb 16 approaches 52 pounds gauge; and this increasing pressure, acting through the tube 15 on the diaphragm 12, causes the plunger 24 to compress the spring 20 and to move the stem 21 in a downward direction. The lower end of the stem 21 then bears down upon the top of the stem 56 and moves that in the same direction, gradually causing the piston 63 to cover the associated passage of the port and pipe 60 and finally, when 300 degrees is reached, to open the port and pipe 60 to the discharge port and pipe 62, thus relieving the pressure on the diaphragms of the valves 68 and 69 and causing them to close. The heating period is now ended and the period in which the still 1 cools down by radiation now begins. As the heating ended, the valve 70 closed. The construction of the standard valve 54, with its operation as above described, is so well known in the art as to require no further explanation.

As the still 1 cools down, the pressure therein drops to such a point that the decreased pressure on the diaphragm 25 allows the spring 35 and the spring device 39 to rotate the lever 29 in a clockwise direction. Such rotation causes the pawl 41 to slide by the end of the latch 45 and then the washer 37 comes in contact with the plug in the end of the casing 33. A continued rotation, therefore, of the lever 29 is caused solely by the spring device 39. As the pressure in the still 1 drops still further, the lever 29 continues to rotate in a clockwise direction under the action of the spring device 39; and the ends 52 and 53 bear down upon the collar 57 and move the stem 56 and the pistons 63 and 64 still further in a downward direction. When a predetermined pressure is reached in the still 1, say atmospheric, the piston 64 opens the port and pipe 61 to the water supply, thereby again opening the valves 65 and 66. A change from the cooling down period to the absorption period is thus effected and the cycle of operation is complete. The valve 71 opens while the pressure in the still 1 drops below the pressure in the evaporators 9 and 72.

It will be noted that the supply of cooling water to the still 1 will yet further temporarily lower the pressure therein and cause a further opening of the port and pipe 61.

A cessation of the flow from the source of water supply will suspend the operation of the machine. It will be noted, also, that the pressure in the parts 16, 15, 13 and 12, at the end of the heating period acts positively through parts in alinement with one another to relieve the pressure in the devices 68 and 69 and to permit the springs therein to act. A safety valve is also indicated in Fig. 1 connected with the still 1.

In case, instead of ammonia, formaldehyde is employed, with water as the absorbent, brass and copper may be used in the refrigerant circuit and the apparatus may be designed in view of the following properties of that refrigerant:

The boiling point at 76 pounds gauge pressure is 90 degrees F.; the percentage of the refrigerant in the weak liquor by weight at 76 pounds gauge pressure and 320 degrees F. is 16.4; the specific heat of the liquor is .921; the B. t. u. heat of dissociation per pound is 315; the boiling point at 6 pounds gauge pressure is 12 degrees F.; the percentage of the refrigerant in the strong liquor by weight at 12 pounds gauge pressure and 90 degrees F. is 42; the B. t. u. heat of absorption per pound is 303; and the latent heat of vaporization at 6 pounds gauge pressure is 250. The non-inflammability of formaldehyde, its low working pressures and its adaptability for use with brass and copper make it especially available as the refrigerant in very small machines.

What I have invented and what I desire to have protected by Letters Patent is expressed in claims as follows.

I claim:

1. In an absorption refrigerating apparatus including a still, a condenser and an evaporator in circuit, a first device for transmitting cooling water to the still, a second device for transmitting the refrigerant from the condenser into the evaporator, a third device for supplying a heating medium to the still, a fourth device for transmitting cooling water to the condenser, a valve communicating with said devices, and means at a high pressure limit in the still actuating the valve to transmit fluid to suspend the operation of the first and second devices and to operate the third and fourth devices, at a high temperature limit in the still actuating the valve to transmit fluid to suspend the operation of the third and fourth devices and upon a cooling down of the still actuating the valve to transmit fluid to operate the first and second devices.

2. In an absorption refrigerating apparatus including a still, a condenser and an evaporator in circuit, a first device for transmitting cooling water to the still, a second device for transmitting the refrigerant from the condenser into the evaporator, a third device for supplying a heating medium to the still, a fourth device for transmitting cooling water to the condenser, and means at a high pressure limit in the still transmitting fluid to suspend the operation of the first and second devices and to operate the third and fourth devices, at a high temperature limit in the still transmitting fluid to suspend the operation of the third and fourth devices and upon a cooling down of the still transmitting fluid to operate the first and second devices.

3. In an absorption refrigerating apparatus including a still, a condenser and an evaporator in circuit, a first device for transmitting cooling water to the still, a second device for transmitting the refrigerant from the condenser into the evaporator, a third device for supplying a heating medium to the still, a fourth device for transmitting cooling water to the condenser, and means controlled by temperature and pressure conditions in the still for transmitting fluid to operate said devices to absorb expanded refrigerant from the evaporator, to expel absorbed refrigerant into the condenser and to transmit condensed refrigerant into the evaporator.

4. In an absorption refrigerating apparatus including a still, a condenser and an evaporator in circuit, means for transmitting refrigerant from the condenser into the evaporator, means for supplying a heating medium to the still, means for supplying cooling water to the still when absorbing and to the condenser when condensing, and means controlled by temperature and pressure conditions in the still to transmit fluid to operate the former means to absorb expanded refrigerant from the evaporator, to expel absorbed refrigerant into the condenser and to transmit condensed refrigerant into the evaporator.

5. In an absorption refrigerating apparatus including a still, a condenser and an evaporator in circuit, means for transmitting refrigerant from the condenser into the evaporator, means for supplying a heating medium to the still, means for transmitting from a source of water supply cooling water to the still when absorbing and to the condenser when condensing, and means controlled by temperature and pressure conditions in the still to transmit water from such source to operate the former means to absorb expanded refrigerant from the evaporator, to expel absorbed refrigerant into the condenser and to transmit condensed refrigerant into the evaporator.

6. In an absorption refrigerating apparatus including a still, a condenser and an evaporator in circuit, and means controlled by temperature and pressure conditions in the still for transmitting fluid to cause the still to absorb expanded refrigerant from the evaporator and to expel absorbed refrigerant into the condenser and to cause the transmission of condensed refrigerant into the evaporator.

7. In an absorption refrigerating apparatus including a still, a condenser and an evaporator in circuit, and means controlled by temperature and pressure conditions in the still for transmitting water from a source of water supply to cause the still to absorb expanded refrigerant from the evaporator and to expel absorbed refrigerant into the condenser and to cause the transmission of condensed refrigerant into the evaporator.

CYRUS H. HAPGOOD.

Witnesses:
GERTRUDE BURGNER,
LOUIS S. RICE.